Figure 2A:
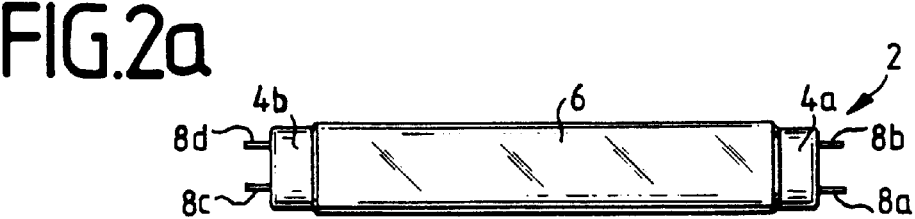
Figure 2B:
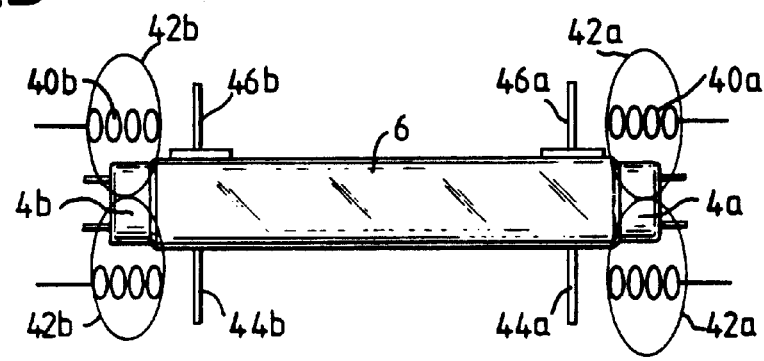
Figure 2C:
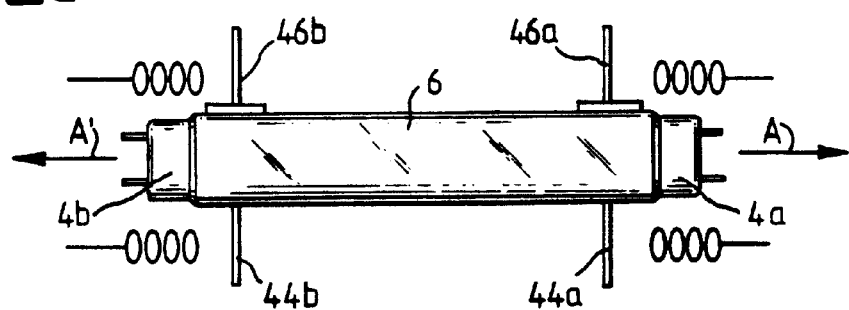
Figure 2D:
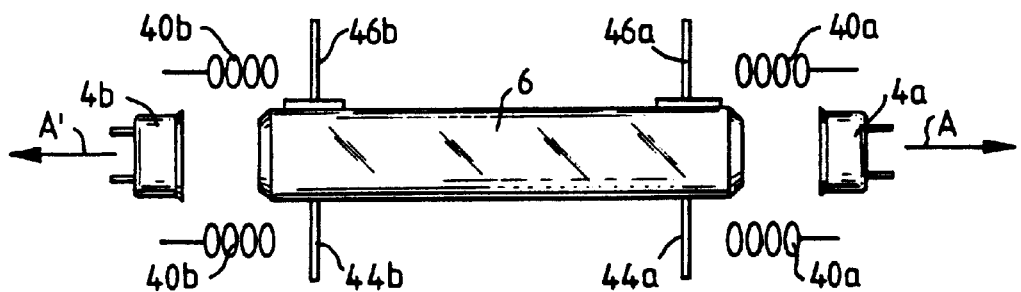

United States Patent [19]
Melber et al.

[11] Patent Number: 6,109,992
[45] Date of Patent: Aug. 29, 2000

[54] INDUCTIVE BASE DETACHMENT METHOD

[75] Inventors: Albrecht Melber, Darmstadt; Erwin Wanetzky, Grosskrotzenberg; Paul Frankenbach, Speckerhohlweg 2B, D-61462 Königstein, all of Germany

[73] Assignees: ALD Vacuum Technologies AG, Erlensee; Paul Frankenbach, Koenigstein, both of Germany

[21] Appl. No.: 09/131,600

[22] Filed: Aug. 10, 1998

[30] Foreign Application Priority Data

Aug. 11, 1997 [DE] Germany .......................... 197 34 687

[51] Int. Cl.[7] .................................................. H01J 9/52
[52] U.S. Cl. ................................................. 445/2; 445/61
[58] Field of Search ........................................ 445/2, 61

[56] References Cited

U.S. PATENT DOCUMENTS

| | | | |
|---|---|---|---|
| 1,920,528 | 8/1933 | Butler et al. | 445/2 |
| 2,478,982 | 8/1949 | Rishell | 445/61 |
| 2,789,194 | 4/1957 | Gosmann | 445/61 |
| 4,715,838 | 12/1987 | Kulander . | |

FOREIGN PATENT DOCUMENTS

| | | |
|---|---|---|
| 3842888 | 7/1990 | Germany . |
| 4030732 | 5/1991 | Germany . |
| 298858 | 3/1992 | Germany . |
| 4131974 | 4/1993 | Germany . |
| 9306089 | 9/1993 | Germany . |
| 4219044 | 12/1993 | Germany . |
| 4302008 | 7/1994 | Germany . |
| 19533142 | 12/1996 | Germany . |
| 19533143 | 12/1996 | Germany . |

*Primary Examiner*—Kenneth J. Ramsey
*Attorney, Agent, or Firm*—Fulbright & Jaworski, LLP

[57] ABSTRACT

Apparatus and method for removing metal bases from glass bulbs such as fluorescent lamps for the salvaging of raw materials therein for reuse. The method comprises providing an inductive field coil about at least one end of the glass bulb having the metal base, heating the metal base by induction to expand and loosen the same, then gripping and pulling the metal base from the bulb. The bulb is kept intact for later salvaging operations such that the removed bases are uncontaminated by mercury. The apparatus can include non-magnetic grippers such as ceramic jaws for the gripping of the metallic bases.

8 Claims, 3 Drawing Sheets

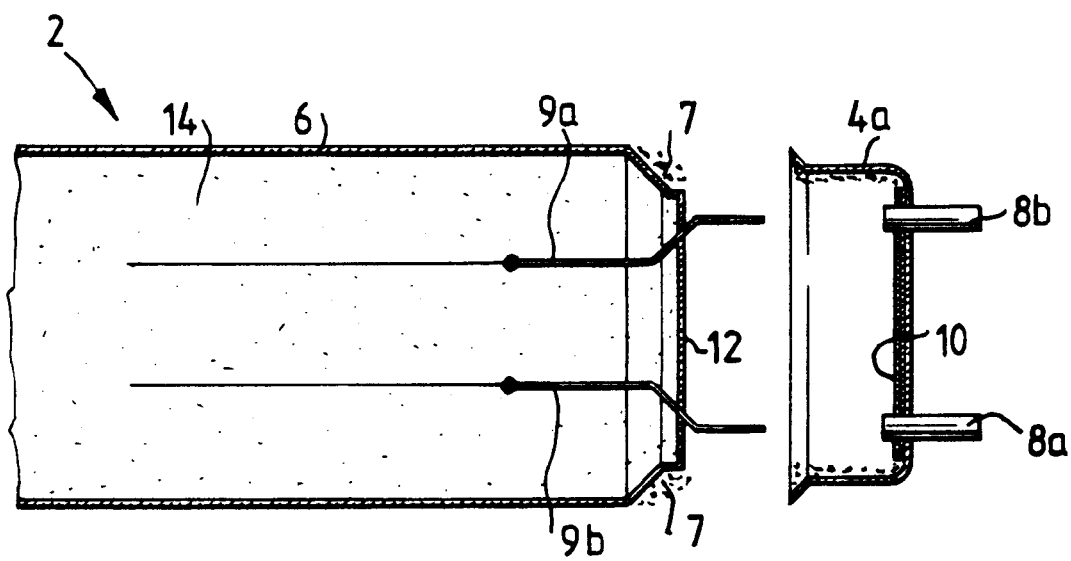

INDUCTIVE BASE DETACHMENT METHOD

The invention relates to a method for the detachment of metal bases attached to glass bulbs, especially fluorescent lamps or other lamps, for the purpose of reuse according to the generic clause of claim 1, and an apparatus to implement the said method according to the generic clause of claim 3.

Reuse of fluorescent lamps or gas discharge lamps carried out in the course of disposal aims to reclaim to the largest possible extent the sorted raw materials used in the manufacture of such fluorescent lamps. Today, such recycling methods are being used more and more with the aim to increase the overall recycling rate.

In the known recycling methods of this kind for the disposal of fluorescent lamps it is necessary to detach the metallic bases affixed to the two ends of the glass bodies of fluorescent lamps. In the common known methods of detachment, the lamps are for example cut open in the end region of the lamp bulb in order to separate the base with the attached glass portion and the electrode.

Thus, DD 298 858 A5, describes a base detachment and disassembly device which makes possible the removal and disassembly into individual components of bases glued to glass containers, for example fluorescent lamps, when the glass container is intact. This base detachment device comprises substantially a gripping device for pulling off the metal base with the attached contact pins. The goal here is to collect the individual components of the fluorescent lamps and to place them into a differentiated material disposal.

Another method for the reclaiming of the various materials used in compact fluorescent lamps is described in DE 42 19 044 A1. In this method the bulb cap is cut off by grinding. The glass fragments adhering to the base are subsequently ejected by the heating and softening of the adhesive material. The methods described in both DD 298 858 A5 and DE 42 19 044 A1 have the disadvantage that a material-specific separation in one processing step is not possible. It was found during practical implementation of the above-described proposed base detachment methods that the holding forces of the adhesive between the base and the bulb body not only vary but are in part also exceptionally strong. Therefore, the differing compositions of the joints between the base and the lamp body have to be taken into account individually in methods of detachment to be used.

An alternative detachment process is described in DE 38 42 888 A1. The fluorescent lamps are enveloped at their ends by closed working containers and are heated by for example a ring burner through which a ring of thermal tension is placed on the lamp body. Subsequent quenching by means of a separation body releases the bases from the lamp body and the bases are moved separately for further processing.

A similar process is described in DE 43 02 008 A1. The compact fluorescent lamps to be processed are first manually or automatically sorted for recycling according to their type of construction. The sorted lamps are placed on a conveyor device. In a next step of the process the thermoplastic components of the mechanical structure are softened by supplying energy in form of radiant heat, hot air, or microwave or medium-frequency radiation, and the soldered connections are separated by melting of the solder. In a next step of the process the glass enclosure of the bulb and the screw base are mechanically removed with the plastic housing so that the actual gas discharge lamp can be processed further separate from the base.

Due to the contamination of the glass adhering to the bases by for example chemically reactive heavy metals, direct further processing or use of the metal bases is, disadvantageously, not possible. Particularly problematic is the further processing of the glass parts contaminated by mercury since mercury amalgamates with bases made of aluminum. Material-specific separation of the materials to be recycled is thereby made especially difficult.

The object of the invention is to provide a method for the detachment of metal bases preferably attached at the ends of fluorescent lamps while avoiding the disadvantages of the known methods, in particular the disadvantage of glass breakage and the undesired mixing of materials, and where a direct further processing of the glass body is not possible due contamination of the glass body with health endangering substances. Furthermore, an apparatus for the implementing of this detachment method is to be created.

According to the invention the object is achieved by the features of the method claim 1. According to claim 1 it is provided that the method for the detachment of metal bases joined with glass bodies, preferably glass bulbs, comprises the following steps.

In a first step, the base to be detached is brought into the effective zone of a preferably movable induction field coil whereby the base is positioned substantially concentric in relation to the coil body. In a subsequent step, electricity flows through the coil in order to generate a magnetic field. Currents induced in the metal base heat the base very evenly which results in the thermal expansion of the base, and the joint between the base and the glass body is loosened such that in a following step the base and the glass body are separated from one another, preferably by means of a gripping device, whereby the base is pulled, preferably completely and in one piece, from the glass body or the glass body from the base. The advantage of this method substantially consists in the selective heating, by means of the induced magnetic field, of the metal parts joined with the lamp body. In this way only the metal parts are heated directly, but not the glass of the lamp body, which results in the detachment from the glass body of the metal base due to its higher thermal expansion coefficient. The induction field coil is switched off either after a predetermined time period or after the base has detached itself from the glass body.

According to the invention, the frequency of the magnetic field induced by the induction field coils is selected on the basis of the geometric size of the metal parts to be heated as indicated in claim 6, whereby smaller metal parts to be heated by the magnetic field require higher frequencies than larger metal parts to be heated. For metal bases present in common fluorescent lamps it has been shown to be advantageous to select magnetic field frequencies in a range from 100 kHz to 400 kHz, preferably in the range from 200 kHz to 300 Khz.

For the removal of the loosened base or bases from the lamp glass body there are provided gripper devices which remove the base or bases in axial direction relative to the glass body. According to the invention, holding jaws made of non-magnetic materials grip the base and remove it from the glass body. These holding jaws are preferably made of ceramic materials, such as for example aluminum oxide and silicon carbide.

According to the features of claim 2, it is provided that when the fluorescent lamps have supply wires that are soldered to the contact pins in the bases, the bases are heated such that the soldered area is heated up to the melting point of the solder by direct coupling of the magnetic field in the soldered area or by the heat conducted from the metal base. Alternatively, the release of the supply wires is achieved by mechanical separation or tearing. According to the invention, the base itself is heated to a minimum temperature of 100° C., preferably to a temperature between 200° C. and 240° C., preferably to a temperature of 215° C. to 235° C.

Apparatus for the implementation of the method is proposed according to the features of claim 3. The device according to the invention comprises a transport device, for example a lifting incremental conveyor for the transport of glow lamps or fluorescent lamps from a staging station to a pass-through chamber for the transfer to a device by which the glow or fluorescent lamps are held such that their bases are concentric with the induction coil. In the case of straight glass bodies having bases at either end or at one end only, the device comprises for example a horizontal bed with depressions, for example prisms, for receiving the glass bodies. In the case of glass bodies having a base on one side only, for example ellipsoid lamp bodies, the said device comprises a ring-shaped receiver into which the glass bodies are placed in a vertical position. A slight negative pressure of a few [hpa], preferably 10 hPa to 200 hPa below atmospheric pressure, is generated in the chamber by means of constant suction in order to prevent escape of gases in the event of unintended glass breakage. After the heating of the base by the induction field energy of the energized coil to a temperature at which the base detaches, the heated and loosened base is pulled away from the lamp bulb or glass tube by a gripper arranged on a pulling device having preferably non-magnetic jaws. The lamp bulb or glass tube is then transportable by means of the transporting device from the detaching station to a ventilating station where the hollow space enclosed by the bulb is ventilated.

A gas burner is provided in the ventilating station. The burner melts a small hole in the glass body. The glass body which is subject to vacuum pressure is thus ventilated to reach the ambient pressure. Subsequently the glass body is moved to the cutting station by means of the transport device.

Gas burners are provided in the adjoining cutting station and the glass body is cut open, preferably along its circumference, by said burners. In addition, a station is provided where the cut glass bulb or glass tube can be blown out to remove the powdered fluorescent material. Finally, the cut-open glass bulb or cut-open glass tube is transferred by for example a transport device to a terminal station where the glass bodies are broken up into a predetermined fragment size.

Lamps with base attachments of different designs can be advantageously recycled by the method and the apparatus, whereby the metal bases can be removed from the lamp glass body without damaging the latter. The method according to the invention is highly reliable and makes it possible to reduce, at low cost, the cycle time of the individual processing steps of the recycling process vis-a-vis the known prior art. The cycle times of the method according to the invention are between 0.5 sec and 2 sec, whereby the cycle times can be further reduced according to the invention by placing several lamps with their bases into the induction coil. An additional advantageous cost savings results from supplying electrical power to at least two coils at a time from one source of electrical current. This increases the recycling rate, particularly with fluorescent lamps.

The invention will be explained in more detail below by an example of a particularly preferred embodiment represented in drawings. Shown are in FIG. 1, the cross section of the base region of a fluorescent lamp with a detached metallic base, in FIGS. 2a–2d, a schematic representation of the individual work steps of the method according to the invention for the detaching of metal bases, and in FIGS. 3a–3c, a schematic drawing of the method steps for ventilating and cutting of the glass body which follow the method steps shown in FIGS. 2a–2d.

FIG. 1 shows the base region of a fluorescent lamp 2. Metal caps 4a, b, made of for example aluminum, are arranged flush with and in contact with the glass body 6 at each end of the fluorescent lamp 2. At the frontal side, between the glass body 6 and the end caps 4a, b, there is adhesive mass 7 which joins the metal bases 4a, b to the glass body 6 and fixes the contact pins 8a, 8b which extend from the frontal side of the glass body 6 and through the extension of end caps 4a, b, and insulates said pins from the metal caps 4a, b. The adhesive mass 7 is composed of 20% phenolic resin/polyvinyl butyrate and 80% filler such as calcite, talcum or filler chalk. Alternatively, the adhesive mass can consist of a mix of water glass/silica dust and silicone resins with fillers. For the electrical insulation of the end caps 4a, b from the contact pins 8a, 8b, the end caps 4a, b have openings through which the contact pins 8a, 8b are guided. At the opposite end, the contact pins 8a, 8b are joined with the supply wires 9a, 9b which extend into the interior of the glass body 6 which is filled with a fluorescent powder 14. Said wires provide the supply of electrical power to the discharge space of the fluorescent lamp 2. The glass body 6 is composed of for example soda-lime glass and changes over into lead glass 12 which is applied at the end side.

The substantial steps of the method according to the invention are shown in FIGS. 2a–2d. According to the method, the glass body 6 with the bases 4a, 4b, each of which is arranged at the ends of said glass body, is positioned in each instance concentrically inside an induction coil 40a, 40b and is held by holders 44a, 44b and hold-downs 46a, 46b. Current is fed through the induction coil 40a or 40b to generate an induction field 42a or 42b. The metallic parts of the bases 4a and 4b, as well as the metallic contact pins 8a, 8b and 8c, 8d, are heated by induction currents generated in the metal caps 4a or 4b. The metallic parts 4a, 4b, 8a, 8b, 8c, 8d expand due to the heating, according to their expansion coefficients. Due to the higher expansion coefficient of the metal cap 4a, 4b as compared to that of the glass, the said cap's seat on the glass body 6 is loosened and it can be pulled from the glass body in the indicated directions A, A' a gripping device not shown in the drawings. The bases 4a, 4b are not contaminated by the harmful materials contained in the glass body 6, for example heavy metals, especially mercury, because the glass body 6 is not opened during the process of detaching the bases 41, 4b, so that the contents are not released into the environment. The uncontaminated detached bases 4a, 4b can be therefore simply sent into further direct recycling processing.

Figure 3A:
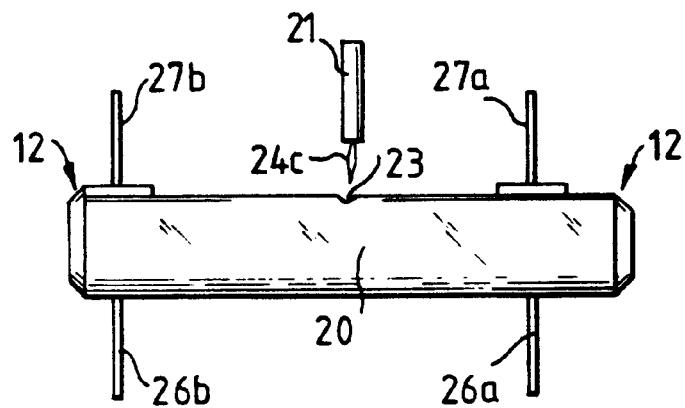
Figure 3B:
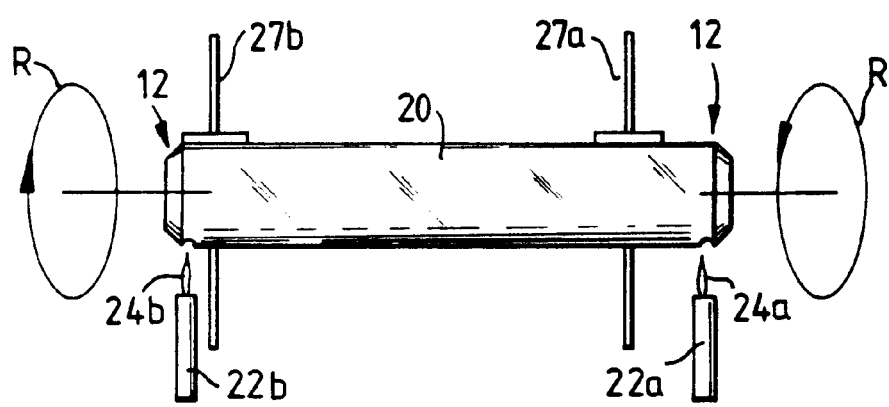
Figure 3C:
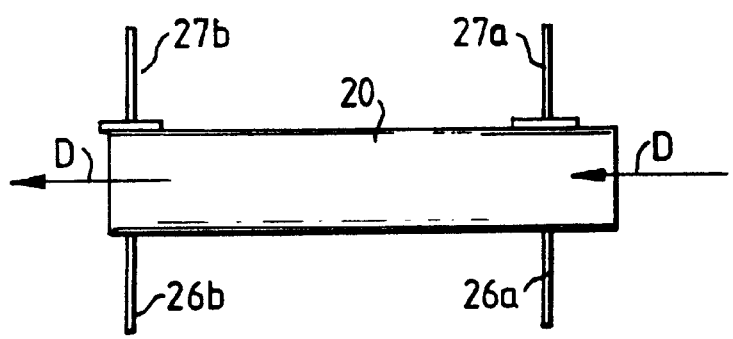

After the prior detaching of the bases 4a, 4b according to the invention, the cutting method represented for example in FIGS. 3a–3c which show the individual steps of the method, is used for the separation of the glass ends. First, as shown in FIG. 3a, at least one hole 23 is burned in the glass tube 20 by means of a torch 21 which produces for example a hydrogen flame 24c, in order to ventilate the said glass tube 20 which is typically evacuated to a negative pressure of 0.1 hPa–10 hPa. The glass tube 20 is held for this by means of hold-downs 27a, 27b on the surface 26a, 26b.

For the subsequent cutting of the lamp ends as shown in FIG. 3b, the glass body is set in rotation R about its longitudinal axis whereby the glass body 20 separates the portion of glass, preferably consisting of lead glass 12, by means of the fixedly positioned torches 22a, 22b. The glass ends are hereby separated due to a thermal shock which takes place in the glass body 20 in the effective zone of the gas flame 24a, 24b for which the tension present in the glass of the glass body 2 [sic] is effectively exploited. The glass tube opened in this fashion at both ends is subsequently blown out in order to remove the mercury-containing fluorescent powder 14. In this known process the fluorescent powder 14 as well as the lamp gas are transferred for further recycling processing.

What is claimed is:

1. Method for the detaching of metallic bases from glass bodies for recycling thereof, said method, comprising:

a first step of bringing at least one of said metallic bases to be detached into an effective zone of an induction field coil whereby the coil body of said induction field coil is positioned substantially concentric in relation to said at least one metallic base;

a second step of inducing electric current flow through at least one said induction field coils in order to generate a magnetic field such that the metallic base is arranged inside the magnetic field and is heated so that the metallic base thermally expands thereby loosening the joint between the metallic base and the glass body;

a third step of separating the metallic base and the glass body from one another so that the metallic base and the glass body can remain in substantially intact condition and, such that any glass bodies which contain poisonous heavy metals, will retain said poisonous heavy metals in such a way that said poisonous heavy metals cannot react with any base-materials of said metallic base, said glass body has a base with a diameter smaller than a diameter of the glass body, said glass body being clamped by holders and hold-downs and the base of which is concentrically surrounded by said induction field coil and is heated until the joint between the bases is loosened by thermal expansion;

wherein said step of separating said metallic base away from the said glass body in the substantially intact condition is accomplished by a gripping and pulling device, and wherein the glass body has at least one end base at each respective end and is transported in an essentially horizontal position such that both bases are substantially concentric with said induction field coils and that the at least one end base at each respective end are pulled away simultaneously from the glass body after loosening of the bases.

2. Method according to claim 1, wherein at least two bases at a time are arranged within induction field coils for the heating of their bases.

3. Method according to claim 1, wherein the loosening of the base is accomplished through heating to a temperature of at least approximately 100° C.

4. Apparatus for the detaching of metallic bases from glass bodies for recycling thereof, said apparatus comprising:

an induction field coil;

a positioning module for bringing at least one of the metallic bases to be detached into an effective zone of said induction field coil whereby the a body of said induction field coil is positioned substantially concentric in relation to said at least one metallic base;

an electric heating module for inducing electric current flow through at least one of said induction field coils in order to generate a magnetic field such that the metallic base is arranged inside the magnetic field and is heated so that the metallic base thermally expands thereby loosening the joint between said metallic base and said glass body;

a separating module for providing for the metallic base and the glass body to be separated from one another so that the metallic base and the glass body can remain substantially intact, such that any glass bodies which contain poisonous heavy metals, will retain said poisonous heavy metals in such a way that said poisonous heavy metals cannot react with any base-materials of said metallic base, a clamping portion for clamping by glass body holders and hold-downs such that the glass body and said metallic base are concentrically surrounded by said induction field coil are heated until the joint between the bases is loosened by thermal expansion;

a gripping and pulling device for separating said metallic base away from the said glass body, wherein the clamping portion is equipped so as to handle glass bodies comprised from at least one of the following glass bulbs or glass discharge tubes of glow lamps or fluorescent lamps without substantial damage thereof, and further having a transport device for the transport of the glow or fluorescent lamp for the transfer to the clamping device such that the clamping device can hold the glow or fluorescent lamp in such a way that the base is within said induction field coil and that the base is pulled from the lamp bulb by the gripping and pulling device after said base has been heated by an energized induction field coil to a temperature sufficient for a loosening of the base by said thermal expansion.

5. Apparatus according to claim 4, wherein the gripping and pulling device comprises holding jaws made of non-magnetic materials provided for the removal of the heated metallic base.

6. Apparatus according to claim 5, wherein the holding jaws are made from a material comprising at least one of the group of aluminum oxide or silicon carbide.

7. Apparatus according to claim 5, wherein the holding jaws are made of ceramic materials.

8. Apparatus according to claim 4, wherein said transporting device is designed as a lifting progressive conveyor for the transporting of glass bodies between transport stations.

* * * * *